(12) United States Patent
Gutowski et al.

(10) Patent No.: US 10,933,716 B2
(45) Date of Patent: Mar. 2, 2021

(54) AUTONOMOUS VEHICLE AND METHOD OF PURGING AN ODOR FROM A PASSENGER CABIN OF SUCH A VEHICLE

(71) Applicant: FORD GLOBAL TECHNOLOGIES, LLC, Dearborn, MI (US)

(72) Inventors: Alan Gutowski, Wixom, MI (US); Jennifer A. Herr-Rathke, Plymouth, MI (US); Manfred Koberstein, Troy, MI (US); Curtis Mark Jones, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 16/362,304

(22) Filed: Mar. 22, 2019

(65) Prior Publication Data
US 2020/0298649 A1    Sep. 24, 2020

(51) Int. Cl.
*B60H 1/00*    (2006.01)

(52) U.S. Cl.
CPC ......... *B60H 1/008* (2013.01); *B60H 1/00742* (2013.01); *B60H 1/00764* (2013.01); *B60H 1/00864* (2013.01)

(58) Field of Classification Search
CPC ............... B60H 1/008; B60H 1/00864; B60H 1/00764; B60H 1/00742
See application file for complete search history.

(56) References Cited

U.S. PATENT DOCUMENTS

| | | | |
|---|---|---|---|
| 4,722,747 A * | 2/1988 | Armbruster | B01D 46/10 96/140 |
| 9,855,816 B2 | 1/2018 | Meyhofer et al. | |
| 9,855,926 B2 | 1/2018 | Stauffer et al. | |
| 9,975,400 B2 * | 5/2018 | Farooq | B60H 1/00771 |
| 10,025,329 B2 * | 7/2018 | Slaby | G06F 1/206 |
| 10,232,680 B2 * | 3/2019 | Park | B60H 1/00849 |
| 10,245,924 B2 * | 4/2019 | Newman | B01D 46/46 |
| 10,282,625 B1 * | 5/2019 | Wengreen | B60K 35/00 |
| 2011/0089255 A1 * | 4/2011 | Kolich | A61L 9/125 239/34 |
| 2014/0318159 A1 * | 10/2014 | Eisenhour | B60H 1/3211 62/89 |

(Continued)

FOREIGN PATENT DOCUMENTS

KR    20180106323 A    10/2018

OTHER PUBLICATIONS

English Machine Translation of KR20180106323A dated Oct. 1, 2018.

*Primary Examiner* — Rodney A Butler
(74) *Attorney, Agent, or Firm* — David Coppiellie; Price Heneveld LLP

(57) ABSTRACT

An autonomous vehicle includes a passenger cabin, a sensor group and a passenger cabin climate control system including a control module. The sensor group includes a passenger cabin odor sensor, an occupancy sensor and a vehicle speed sensor. The control module has a control logic adapted to purge an odor from the passenger cabin in response to data received from the sensor group indicating the presence of an odor in the passenger cabin, an unoccupied passenger cabin and the autonomous vehicle is moving at a minimum predetermined speed for a minimum predetermined time.

11 Claims, 3 Drawing Sheets

(56) References Cited

U.S. PATENT DOCUMENTS

| | | | |
|---|---|---|---|
| 2016/0280160 A1* | 9/2016 | MacNeille | G05B 15/02 |
| 2017/0313314 A1* | 11/2017 | Sen | B60W 30/16 |
| 2018/0057013 A1* | 3/2018 | Mullett | B60H 1/267 |
| 2018/0186212 A1 | 7/2018 | Kundu et al. | |
| 2018/0195911 A1 | 7/2018 | Kakade et al. | |
| 2018/0281560 A1* | 10/2018 | Dearth | B60H 1/00742 |
| 2018/0319406 A1 | 11/2018 | Dudar | |
| 2018/0326811 A1 | 11/2018 | Chelian et al. | |
| 2018/0361009 A1* | 12/2018 | Kim | H01T 23/00 |
| 2020/0047720 A1* | 2/2020 | Maeshiro | A47L 7/0076 |
| 2020/0101980 A1* | 4/2020 | Adams | G08G 1/096775 |

\* cited by examiner

AUTONOMOUS VEHICLE AND METHOD OF PURGING AN ODOR FROM A PASSENGER CABIN OF SUCH A VEHICLE

TECHNICAL FIELD

This document relates generally to autonomous vehicles as well as to a method of purging an odor from a passenger cabin of an autonomous vehicle.

BACKGROUND

In the future, many autonomous vehicles will be used as shared transportation vehicles for purchased rides. Some customers may leave undesirable odors in the passenger cabin of the autonomous vehicle after using the autonomous vehicle for a purchased ride. This can negatively impact the next customer's user experience.

This document relates to an autonomous vehicle incorporating an odor purge system as well as to a method of purging an odor from a passenger cabin of an autonomous vehicle.

SUMMARY

In accordance with the purposes and benefits described herein, an autonomous vehicle is provided. That autonomous vehicle comprises (a) a passenger cabin, (b) a sensor group including a passenger cabin odor sensor, an occupancy sensor and a vehicle speed sensor and (c) a passenger cabin climate control system including a control module. That control module has a control logic adapted or configured to purge an odor from the passenger cabin in response to data received from the sensor group indicating (a) the presence of an odor in the passenger cabin, (b) an unoccupied passenger cabin and (c) the autonomous vehicle is moving at a minimum predetermined speed for a minimum predetermined amount of time.

The sensor group may further include an ambient air temperature sensor sensing current ambient air temperature and the control logic of the control module may be further configured or adapted to operate in a first mode when the current ambient air temperature is equal to or above a predetermined temperature and a second mode when the current ambient air temperature is below that predetermined temperature. In addition, the control logic of the control module may include a timer measuring the duration of a current purge air cycle.

The sensor group may further include an evaporator temperature sensor measuring current evaporator temperature. Further, the control logic of the control module may be adapted or configured to pause the timer when data from the evaporator temperature sensor indicates a current evaporator temperature above a predetermined evaporator temperature at which the climate control system switches from fresh inlet air to recycled passenger cabin inlet air.

Still further, the sensor group may include a door position sensor sensing positions of all doors allowing users to enter and exit the passenger cabin. Further, the passenger cabin climate control system may include a blower speed controller operable in response to the control module when the control module is purging the odor from the passenger cabin.

The passenger cabin climate control system may further include air distribution features selectively directing conditioned air through a plurality of vents into the passenger cabin wherein the air distribution features are operable in response to the control module when the control module is purging the odor from the passenger cabin. In addition, the passenger cabin climate control system may include an air inlet door actuator displacing an air inlet door between a fresh air inlet position and a recycled passenger cabin air inlet position. That air inlet door actuator is operable in response to the control module when the control module is purging the odor from the passenger cabin.

In accordance with an additional aspect, a method of purging an odor from a passenger cabin of an autonomous vehicle comprises the steps of: (a) detecting, by a passenger cabin odor sensor, the presence of an odor in the passenger cabin, (b) detecting, by an occupancy sensor, an occupancy state of the passenger cabin, (c) detecting, by a vehicle speed sensor, a current speed of the autonomous vehicle and (d) purging, by a control module and operation of a passenger cabin climate control system, the odor from the passenger cabin when the odor is detected, the passenger cabin is unoccupied and the autonomous vehicle has been moving at at least a predetermined minimum speed for a predetermined minimum time.

The method may further include the step of detecting, by an ambient air temperature sensor, the current ambient air temperature. Further, the method may include the step of operating, by the control module, the climate control system: (a) in a first mode when the current ambient air temperature is equal to or above a predetermined temperature and in a second mode when the current ambient air temperature is below the predetermined temperature in order to purge the odor from the passenger cabin.

Further, the method may include the step of purging the odor from the passenger cabin for a predetermined period of time as measured by a timer. In addition, the method may include the step of detecting, by an evaporator temperature sensor, a current evaporator temperature. Still further, the method may include the step of pausing, by the control module, the timer when the current evaporator temperature exceeds a predetermined evaporator temperature at which the passenger cabin climate control system switches from fresh inlet air to recycled passenger cabin inlet air.

In addition, the method may include the step of detecting, by a door position sensor, current position of all doors allowing users to enter and exit the passenger cabin. Further, the method may include the step of controlling, by the control module, an operating speed of a blower of the passenger cabin climate control system. Still further, the method may include the step of controlling, by the control module, air distribution features of the passenger cabin climate control system whereby air may be directed so as to better sweep odors from the passenger cabin of the autonomous vehicle.

In the following description, there are shown and described several preferred embodiments of the autonomous vehicle and the related method of purging an odor from a passenger cabin of an autonomous vehicle. As it should be realized, the autonomous vehicle and method are capable of other, different embodiments and their several details are capable of modification in various, obvious aspects all without departing from the autonomous vehicle and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the autonomous vehicle and method and together with the description serve to explain certain principles thereof.

Reference will now be made in detail to the present preferred embodiments of the autonomous vehicle and related method of purging an odor from a passenger cabin of an autonomous vehicle, examples of which are illustrated in the accompanying drawing figures.

DETAILED DESCRIPTION

Figure 1:
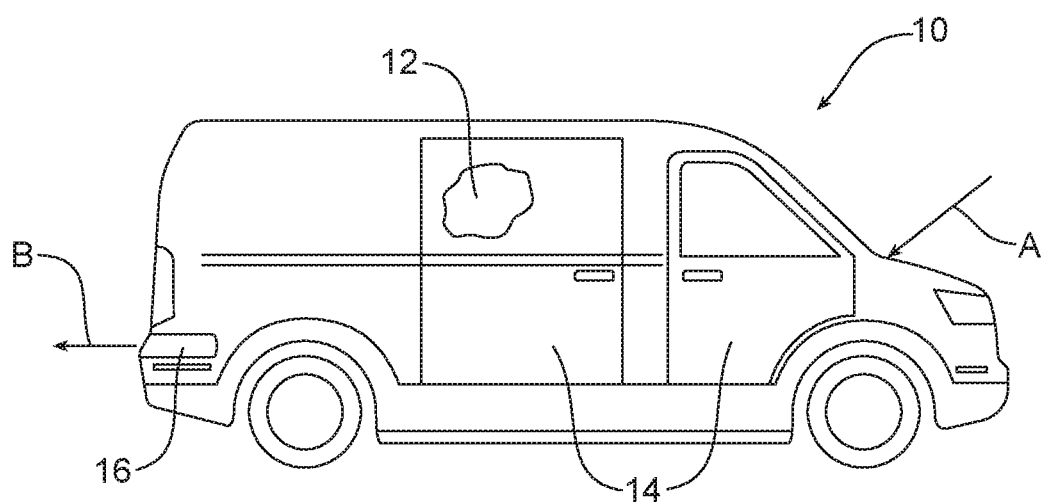
FIG. 1 is a schematic illustration of the autonomous vehicle illustrating the intake of the fresh air and the discharge of odors from the passenger cabin during a purge air cycle.
Figure 2:
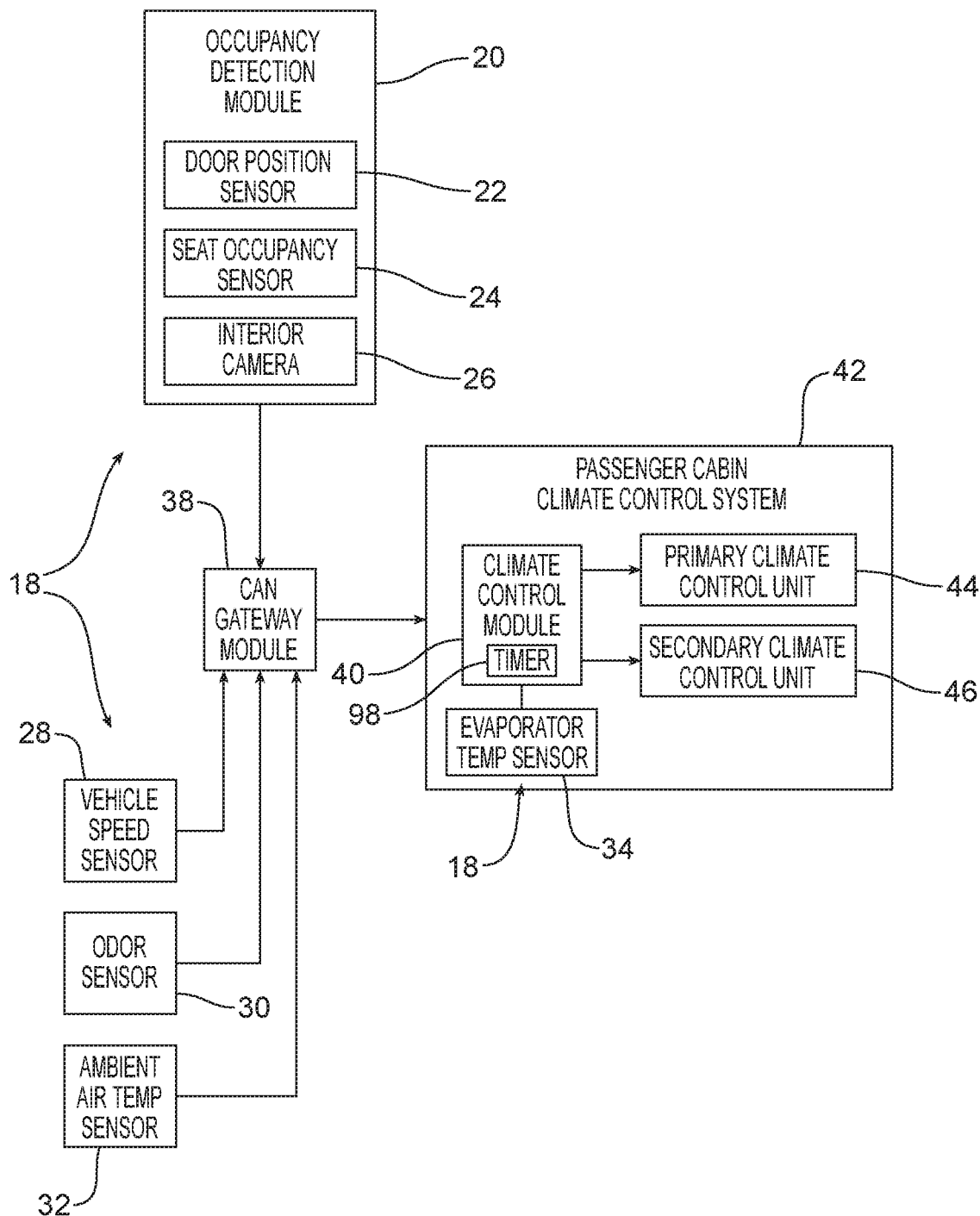
FIG. 2 is a schematic block diagram illustrating the odor purge system of the autonomous vehicle.
Figure 3:
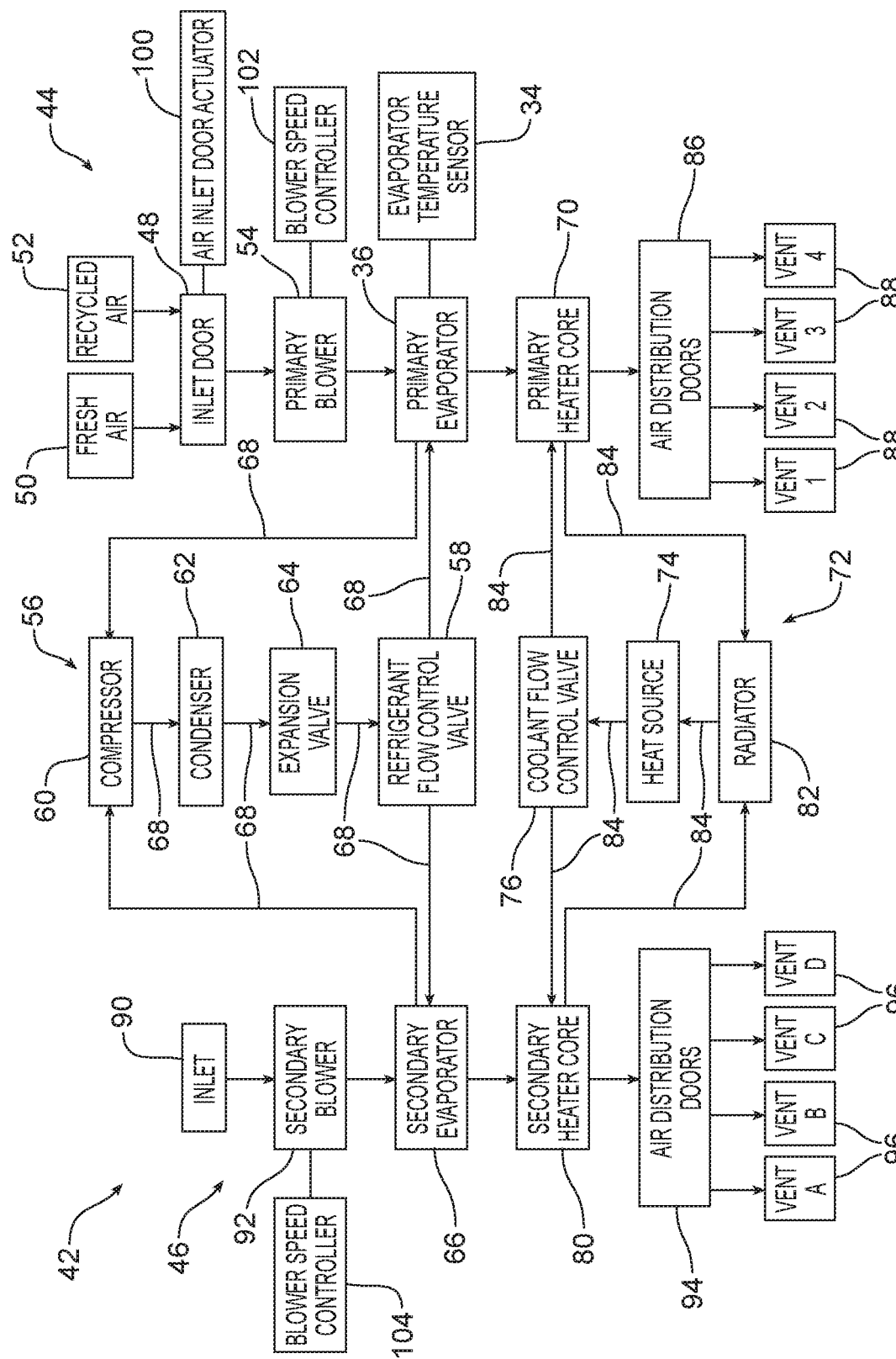
FIG. 3 is an additional block diagram illustrating details of the odor purge system including detailed aspects of the passenger cabin climate control system.

Reference is now made to FIGS. 1-3 illustrating an autonomous vehicle 10 having an interior passenger cabin 12 that may be occupied by ride purchasers (not shown). Those ride purchasers may enter and exit the autonomous vehicle through one or more doors 14. As will be explained in greater detail below, the autonomous vehicle 10 allows the purging of odors from the passenger cabin 12 by drawing in fresh air (note action arrow A) into the passenger cabin 12 and exhausting odors from the passenger cabin through air extractors 16 provided at the rear of the vehicle (note action arrow B).

Reference is now made to FIGS. 2 and 3 illustrating additional details of the autonomous vehicle 10. As illustrated, the autonomous vehicle 10 includes a sensor group generally designated by reference numeral 18. That sensor group 18 includes the occupancy detection module 20 that is adapted or configured to monitor the occupancy of the passenger cabin 12 of the autonomous vehicle 10. The occupancy detection module 20 may include, for example, one or more door position sensors 22, one or more seat occupancy sensors 24 and one or more interior cameras 26.

More particularly, the door position sensor 22 may be of a type known in the art for monitoring the open and close status of the doors 14 of the autonomous vehicle 10 that allow individuals to enter and exit the passenger cabin 12. The seat occupancy sensor 24 may be of a type known in the art configured or adapted to monitor whether or not the seats of the autonomous vehicle 10 within the passenger cabin 12 are occupied. Similarly, the interior camera 26 may be of a type known in the art adapted and configured to monitor the occupancy of the passenger compartment 12.

The sensor group 18 also includes a vehicle speed sensor 28, of a type known in the art, adapted for monitoring the speed of the autonomous vehicle. Still further, the sensor group 18 may include one or more odor sensors 30 of a type known in the art that are adapted or configured for detecting the presence of odors in the passenger cabin 12 of the autonomous vehicle 10. Still further, the sensor group 18 includes an ambient air temperature sensor 32 of a type known in the art for monitoring the current ambient air temperature.

The sensor group 18 of the illustrated embodiment also includes an evaporator temperature sensor 34 of a type known in the art adapted or configured to monitor the temperature of the primary evaporator 36 as will be described in greater detail below. See also FIG. 3.

As illustrated in FIG. 2, the door position sensor 22, seat occupancy sensor 24 and interior camera 26 of the occupancy detection module 20 and the vehicle speed sensor 28, odor sensor 30 and ambient air temperature sensor 32 are all connected to the CAN gateway module 38 of the autonomous vehicle 10 so as to allow data from that group of sensors to be provided to the climate control module 40 of the passenger cabin climate control system 42. As further illustrated in FIG. 2, the evaporator temperature sensor 34 is a part of the passenger cabin climate control system 42, thereby allowing direct data communication from the evaporator temperature sensor to the climate control module 40.

The climate control module 40 is configured or adapted to control the primary climate control unit 44 and the secondary climate control unit 46 of the autonomous vehicle 10. In one possible embodiment, the climate control module 40 comprises a computing device such as a dedicated microprocessor or an electronic control unit (ECU) operating in accordance with instructions from appropriate control software. Thus, the climate control module 40 comprises one or more processors, one or more memories and one or more network interfaces all in communication with each other over one or more communication buses. As will become apparent from the following description, the climate control module 40 has control logic adapted to purge an odor from the passenger cabin 12 in response to data received from the sensor group 18 indicating: (a) the presence of an odor in the passenger cabin, (b) an unoccupied passenger cabin and (c) the autonomous vehicle is moving at a minimum predetermined speed for a minimum predetermined time.

Reference is now made to FIG. 3 illustrating further details of the passenger cabin climate control system 42 including the primary climate control unit 44 and the secondary climate control unit 46. More particularly, as illustrated the primary climate control unit 44 includes an inlet door 48 for controlling the intake of fresh air 50 or recycled passenger cabin air 52 into the primary climate control unit 44. During any purge air cycle for purging odor from the passenger cabin 12 of the autonomous vehicle 10, the inlet door 44 is set to only intake fresh air 50. At other times, efficient operation of the primary climate control unit 44 may call for intake of a mixture of fresh air and recycled air or even intake of only recycled air.

The primary blower 54 draws the fresh air 50 and/or cycled air 52 through the inlet door 48 and then forces that air through the primary evaporator 36 where that air is in heat exchange relationship with cold refrigerant provided from the refrigerant circuit 56 by the refrigerant flow control valve 58. Refrigerant circuit 56 is of a type known in the art including a compressor 60, a condenser 62 and an expansion valve 64. As will be further explained below, the refrigerant flow control valve 58 is adapted or configured to direct cold refrigerant to either the primary evaporator 36 of the primary climate control unit 44 or the secondary evaporator 66 of the secondary climate control unit 46 where that refrigerant is in heat exchange relationship with the airstream being conditioned by the secondary climate control unit. After the refrigerant flows through the primary evaporator 36 and/or the secondary evaporator 66 for heat exchange, it is returned to the compressor 60. The action arrows 68 illustrate the flow of refrigerant through the refrigerant circuit 56.

After passing through the primary evaporator 36, the airstream is forced by the primary blower 54 through the primary heater core 70 where it may be heated to a desired set temperature for the passenger cabin by heat exchange with coolant from the coolant circuit 72.

As illustrated, coolant circuit 72 includes a heat source 74 such as a power train (e.g. drive motor and associated power train battery) and autonomous vehicle electronics. In addition, the coolant circuit 72 includes a coolant flow control valve 76 for directing hot coolant to either the primary heater core 70 of the primary climate control unit 44 or the secondary heater core 80 of the secondary climate control unit 46. The coolant flowing through the primary heater core 70 heats the air stream being conditioned by the primary climate control unit 44 while the coolant flowing through the secondary heater core 80 heats the airstream being conditioned by the secondary climate control unit 46. After the coolant flows through the primary heater core 70 and the secondary heater core 80, it is returned to the radiator 82 of the coolant circuit 72 where it is cooled before being recycled back to the heat source 74. The coolant circuit 72 may also include a heater core bypass (not shown). Action arrows 84 illustrate the flow of coolant through the coolant circuit 72.

After the airstream passes through the primary heater core 70, the primary blower 54 forces the now fully conditioned air through a series of air distribution doors 86 of a type known in the art that allow distribution of the conditioned air through the air discharge vents 88. While four vents 88 are illustrated in FIG. 3, it should be appreciated that a different number of vents could be provided if desired. The air distribution doors 86 may be fully controlled and positioned through the use of electronic actuators for air distribution by the climate control module 40 in a manner known in the art.

The secondary climate control unit 46 includes an inlet 90 through which passenger cabin air is drawn by the secondary blower 92. The secondary blower 92 then forces that airstream through the secondary evaporator 66 for heat exchange with the refrigerant received from the refrigerant flow control valve 58. The airstream is then forced by the secondary blower 92 through the secondary heater core 80 in heat exchange relationship with coolant directed through the secondary heater core by the coolant flow control valve 76. The secondary blower 92 then forces the conditioned airstream through the air distribution doors 94 which, under the control of the climate control module 40, direct the conditioned air to the various vents 96. In the illustrated embodiment, four vents 96 are shown. It should be appreciated that a different number of vents may be provided if desired.

The passenger cabin climate control system 42 may be utilized in a method of purging an odor from the passenger cabin 12 of the autonomous vehicle 10. That method may be broadly described as including the steps of: (a) detecting, by the passenger cabin odor sensor 30, the presence of an odor in the passenger cabin 12, (b) detecting, by an occupancy sensor 22, 24, 26 of the occupancy detection module 20, an occupancy state of the passenger cabin, (c) detecting, by the vehicle speed sensor 28, a current speed of the autonomous vehicle and (d) purging, by the climate control module 40 and operation of the passenger cabin climate control system 42, the odor from the passenger cabin when the odor is detected, the passenger cabin is unoccupied and the autonomous vehicle has been moving at, at least a predetermined minimum speed for a predetermined minimum period of time. The odor is purged from the passenger cabin 12 when the passenger cabin is unoccupied so as to avoid exposing the customer or rider to low or high speed air and any resulting thermal and acoustic discomfort. It is desirable to wait until the autonomous vehicle 10 is moving at a minimum predetermined speed for a minimum predetermined time so that the passenger cabin climate control system 42 is operating at greater efficiency when RAM airflow is being pushed through the condenser 62.

The method may also include the step of detecting, by the ambient air temperature sensor 32 the current ambient air temperature. Further, the method may include the step of operating, by the control module 40, the climate control system 42: (a) in a first mode when the ambient air temperature is equal to or above a predetermined temperature and (b) in a second mode when the ambient air temperature is below the predetermined temperature in order to purge the odor from the passenger cabin. More particularly, the first mode may comprise the primary climate control unit 44 activated and in a panel/floor mode, the secondary climate control unit 46 deactivated, the primary climate control blower speed on high and the air inlet door 48 set for fresh air 50 (evaporator temperature monitored for pausing method as described below).

In contrast, the second mode may comprise: the primary climate control unit 44 activated and in defrost and/or floor mode, the secondary climate control unit 46 deactivated, the primary climate control blower speed on high and the air inlet door 48 set for fresh air 50 (evaporator temperature not monitored for pausing method as described below).

Still further, the method may include the step of purging the odor from the passenger cabin 12 for a predetermined period of time as measured by the timer 98. As illustrated in FIG. 2, that timer 98 may be integrated into the climate control module 40 if desired. In other embodiments, each purge air cycle may continue until the odor is eliminated from the passenger cabin 12 as confirmed by the odor sensor 30.

In accordance with an additional aspect, the method may include the step of detecting, by the evaporator temperature sensor 34, the current temperature of the primary evaporator 36. In such an embodiment, the method may further include the step of pausing, by the control module 40, the timer 98 when the current evaporator temperature exceeds a predetermined evaporator temperature at which the climate control module 40 of the passenger cabin climate control system 42 causes the inlet door 48 to be displaced from fresh inlet air 50 to recycled passenger cabin inlet air 52. This is because odor purge is not possible when passenger cabin air is being recycled at the inlet door 48. When the climate control module 40 of the passenger cabin climate control system 42 repositions the inlet door 48 for the intake of only fresh air 50, the purge cycle may continue and the timer 98 may be restarted. The climate control module 40 repositions the inlet door 48 by sending a control signal to the air inlet door actuator 100.

The method may include other, additional steps. For example, the method may include the step of detecting, by the door position sensor 22, the position of all doors 14 allowing users to enter and exit the passenger cabin 12. More particularly, the opening and closing of any of the doors 14 may signal the climate control module 40 to reconfirm the occupancy of the passenger cabin 12 utilizing data from the seat occupancy sensor 24 and/or the interior camera 26.

Further, the method may include the step of controlling, by the control module 40, an operating speed of either or both blowers 54, 92 of the passenger cabin climate control system 42. This is done by sending a control signal from the control module 40 to the respective blower speed controllers 102, 104 for the primary blower 54 and the secondary blower 92. Further, the method may include the step of controlling, by the control module 40 the air distribution features or doors 86, 94 of the respective primary climate control unit 44 and secondary climate control unit 46 of the passenger cabin climate control system 42. More specifically, by controlling the operation of the primary blower 54 and the secondary blower 92, the climate control module 40 controls the force of the conditioned air being directed into the passenger cabin 12. In addition, by controlling the operation of the air distribution doors 86 and the air distribution doors 94, the climate control module 40 controls where the conditioned air is being directed into the passenger cabin 12. Further, in some embodiments the climate control module 40 actually controls the directional orientation of the various vents 88, 96 by controlling electronic actuators of a type known in the art (not shown) suitable for that purpose. Taken together, the control of the force of the conditioned airstream, the point of origination of the conditioned airstream and the direction of the conditioned airstream from the point of origination, the climate control module 40 can effectively sweep odor from the passenger cabin 12 toward the air extractors 16 in a manner that allows for greater operating efficiency and the more effective purging of odors from the passenger cabin 12. In this way future ride purchasers are not exposed to odors from previous ride purchasers and thereby have an opportunity for a more pleasant transportation experience.

The new and improved autonomous vehicle and method allow for flexible operation. The climate control module 40 may be configured by an operator through a human machine interface (HMI), such as a touch screen in the vehicle, or remotely by wireless communication to operate in various operating modes. For example, the climate control module 40 may be configured to purge the passenger cabin every time after the vehicle reaches its destination and all riders exit the vehicle. The climate control module 40 may be configured to only purge the passenger cabin periodically after a predetermined passage of time and then only when the passenger cabin is unoccupied and the vehicle is traveling at at least a predetermined speed for a given period of time. The climate control module 40 may be configured to only purge the passenger cabin after an odor has been detected in the passenger cabin by the odor sensor 30, the passenger cabin is unoccupied and the vehicle is traveling above a certain speed for a given period of time. These are just three of the many possible ways the climate control module 40 may be configured to perform the cabin purge function.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An autonomous vehicle, comprising:
   a passenger cabin;
   a sensor group including an occupancy sensor and a vehicle speed sensor; and a passenger cabin climate control system including a control module having a control logic adapted to purge an odor from said passenger cabin in response to data received from said sensor group indicating (a) an unoccupied passenger cabin and (b) said autonomous vehicle is moving at a minimum predetermined speed for a minimum predetermined time, wherein said sensor group further includes an ambient air temperature sensor sensing current ambient air temperature and said control logic of said control module is adapted to operate in a first mode, when said current ambient air temperature is equal to or above a predetermined temperature and a second mode when said current ambient air temperature is below said predetermined temperature and a second mode control logic of said control module includes a timer measuring a duration of a current purge air cycle, wherein said sensor group further includes an evaporator temperature sensor measuring current evaporator temperature, and wherein said control logic of said control module is adapted to pause said timer when data from said evaporator temperature sensor indicates a current evaporator temperature above a predetermined evaporator temperature at which said passenger cabin climate control system switches from fresh inlet air to recycled passenger cabin air inlet air.

2. The autonomous vehicle of claim 1, wherein said sensor group further includes a door position sensor sensing positions of all doors allowing users to enter and exit said passenger cabin.

3. The autonomous vehicle of claim 2, wherein said passenger cabin climate control system includes a blower speed controller operable in response to said control module when said control module is purging said odor from said passenger cabin.

4. The autonomous vehicle of claim 3, wherein said passenger cabin climate control system includes air distribution features selectively directing conditioned air through a plurality of vents into said passenger cabin wherein said air distribution features are operable in response to said control module when said control module is purging said odor from said passenger cabin.

5. The autonomous vehicle of claim 4, wherein said passenger cabin climate control system includes an air inlet door actuator displacing an air inlet door between a fresh air inlet position and a recycled passenger cabin air inlet position wherein said air inlet door actuator is operable in response to said control module when said control module is purging said odor from said passenger cabin.

6. The autonomous vehicle of claim 1, wherein said sensor group includes a passenger cabin odor sensor and said control logic of said control module is adapted to purge the odor from the passenger cabin when said passenger cabin odor sensor indicates presence of the odor in the passenger cabin.

7. An autonomous vehicle, comprising:
   a passenger cabin;
   a sensor group including an occupancy sensor and a vehicle speed sensor; and
   a passenger cabin climate control system including a control module having a control logic adapted to purge an odor from said passenger cabin in response to data received from said sensor group indicating (a) an unoccupied passenger cabin and (b) said autonomous vehicle is moving at a minimum predetermined speed for a minimum predetermined time, wherein said sensor group includes a passenger cabin odor sensor and said control logic of said control module is adapted to purge the odor from the passenger cabin when said passenger cabin odor sensor indicates presence of the odor in the passenger cabin, wherein said sensor group further includes an evaporator temperature sensor measuring current evaporator temperature, and wherein said control logic of said control module is adapted to pause a timer when data from said evaporator temperature sensor indicates a current evaporator temperature above a predetermined evaporator temperature at which said climate control system switches from fresh inlet air to recycled passenger cabin air inlet air.

8. A method of purging an odor from a passenger cabin of an autonomous vehicle, comprising:
- detecting, by an occupancy sensor, an occupancy state of said passenger cabin;
- detecting, by a vehicle speed sensor, a current speed of said autonomous vehicle; and
- purging, by a control module and operation of a passenger cabin climate control system, said odor from said passenger cabin when said passenger cabin is unoccupied and said autonomous vehicle has been moving at least a predetermined minimum speed for a predetermined minimum period of time;
- detecting, by an ambient air temperature sensor, current ambient air temperature; and operating, by said control module, said climate control system (a) in a first mode when said current ambient air temperature is equal to or above a predetermined temperature and (b) in a second mode when said current ambient air temperature is below said predetermined temperature in order to purge said odor from said passenger cabin;
- purging said odor from said passenger cabin for a predetermined period of time as measured by a timer;
- detecting, by an evaporator temperature sensor, a current evaporator temperature; and
- pausing, by said control module, said timer when said current evaporator temperature exceeds a predetermined evaporator temperature at which said passage cabin climate control system switches from fresh inlet air to recycled passenger cabin inlet air.

9. The method of claim 8, further including detecting, by a door position sensor, current position of all doors allowing users to enter and exit said passenger cabin.

10. The method of claim 8, further including detecting, by a passenger cabin odor sensor, presence of the odor in the passenger cabin and configuring said control module to purge the odor from the passenger cabin when the odor is detected.

11. The method of claim 10, further including controlling, by said control module, an operating speed of a blower of said passenger cabin climate control system and controlling, by said control module, air distribution features of said passenger cabin climate control system.

\* \* \* \* \*

UNITED STATES PATENT AND TRADEMARK OFFICE
CERTIFICATE OF CORRECTION

PATENT NO. : 10,933,716 B2  
APPLICATION NO. : 16/362304  
DATED : March 2, 2021  
INVENTOR(S) : Gutowski et al.

Page 1 of 1

It is certified that error appears in the above-identified patent and that said Letters Patent is hereby corrected as shown below:

In the Claims

Column 10;  
Claim 8, Line 7:  
"passage" should be --passenger--.

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*